United States Patent [19]
Bechthold et al.

[11] Patent Number: 5,322,669
[45] Date of Patent: Jun. 21, 1994

[54] CHEMICAL OXYGEN GENERATOR HAVING A REACTION-CONTROL MEMBER

[75] Inventors: Hans-Christoph Bechthold, Hamburg; Rainer Ernst, Curau; Udo Burchardt, Gross Grönau; Uwe Gerdts, Ratzeburg; Karsten Vogeler, Brunsbek, all of Fed. Rep. of Germany

[73] Assignee: Drägerwerk Aktiengesellschaft, Lübeck, Fed. Rep. of Germany

[21] Appl. No.: 994,331

[22] Filed: Dec. 21, 1992

[30] Foreign Application Priority Data

Dec. 21, 1991 [DE] Fed. Rep. of Germany ....... 4142505

[51] Int. Cl.$^5$ ............................................. A62B 7/08
[52] U.S. Cl. .................................. 422/120; 422/165; 422/164; 422/305
[58] Field of Search ............... 422/120, 164, 165, 805, 422/220, 271, 171, 177, 211; 423/579

[56] References Cited

U.S. PATENT DOCUMENTS

| | | | |
|---|---|---|---|
| 1,834,577 | 12/1931 | Cline | 422/271 |
| 3,796,002 | 3/1974 | Katsuda | 422/305 |
| 4,171,340 | 10/1979 | Nishimura et al. | 422/305 |
| 4,197,213 | 4/1980 | Pietz et al. | 422/120 |
| 4,241,485 | 12/1980 | McBride | 422/120 |
| 4,318,894 | 3/1982 | Hensel et al. | 422/220 |
| 4,726,105 | 2/1988 | Yamanaka et al. | 422/177 |
| 4,728,503 | 3/1988 | Iida et al. | 422/177 |
| 4,981,655 | 1/1991 | Kolbe et al. | 422/120 |

FOREIGN PATENT DOCUMENTS

| | | |
|---|---|---|
| 139956 | 8/1930 | Switzerland . |
| 180448 | 1/1936 | Switzerland . |
| 183336 | 6/1936 | Switzerland . |

Primary Examiner—Robert J. Warden
Assistant Examiner—Hien Tran
Attorney, Agent, or Firm—Walter Ottesen

[57] ABSTRACT

The invention relates to a chemical oxygen generator having a chemical charge arranged within a housing. This chemical charge is brought to an exothermal oxygen-releasing reaction by an ignition device with the reaction running through the chemical charge in the form of a reaction front defining a surface and starting from the ignition-end wall of the housing. The oxygen generator has at least one reaction-control member arranged within the chemical charge. A generator of this kind is improved in that the oxygen flow and the supply duration can be influenced by the material and-/or the shape of the reaction-control member. The improvement is achieved in that one or more reaction-control members made of sheet metal are arranged parallel to the direction of movement of the reaction front. As an alternative, the reaction-control member can be configured in the form of a spiral conveyor which is made of sheet metal or a thermally-insulating material. Furthermore, the reaction-control member can be a spirally-wound band made of sheet metal or a thermally-insulating material and arranged in a can-shaped housing.

8 Claims, 2 Drawing Sheets

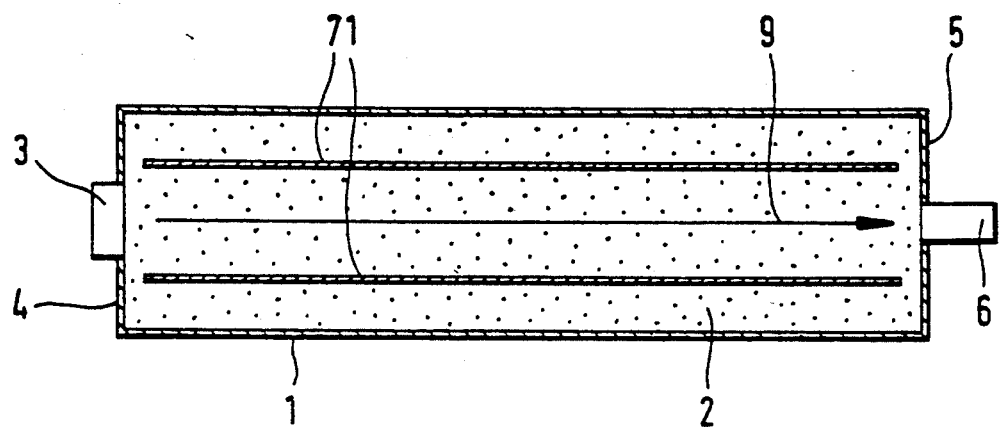
Fig.1
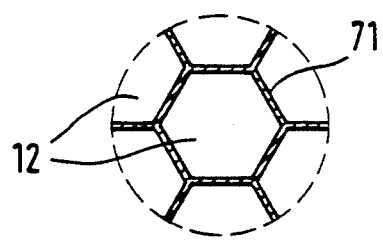 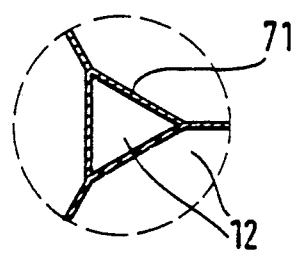
Fig.2a               Fig.2b

CHEMICAL OXYGEN GENERATOR HAVING A REACTION-CONTROL MEMBER

FIELD OF THE INVENTION

The invention relates to a chemical oxygen generator having a chemical charge arranged within the housing. The charge is brought into an exothermal oxygen-releasing reaction by means of an ignition device and the reaction moves in the form of a reaction front defining a surface. The reaction starts at the wall of the housing on which the ignition device is mounted and moves through the chemical charge. At least one reaction-control member is arranged within the chemical charge.

BACKGROUND OF THE INVENTION

Chemical oxygen generators include a cartridge containing a chemical charge and have a starting device at one end of the cartridge. The starting device is in the form of an ignition device and an oxygen outlet is provided in the end of the cartridge lying opposite the ignition device. After activating the ignition device, the chemical charge releases oxygen in an exothermal reaction with the oxygen leaving the cartridge through the oxygen outlet. The chemical charge can, for example, be sodium chlorate with additives. The reaction front runs from the ignition device to the oxygen outlet. The oxygen quantity (the oxygen flow) supplied per unit of time and the time duration of this supply are dependent upon the geometry of the chemical charge and the formulation of this charge. Furthermore, flow and supply duration can be influenced by the reaction-control members.

Swiss Patent 139,956 discloses an oxygen generator wherein the chemical charge is provided with a slit starting at the ignition end and running parallelly to the reaction front and into the region of the opposite-lying end. An insulating plate is inserted into the slit as a partition element which prevents the reaction from jumping over to the other side. The chemical charge reacts first only on one side of the insulating plate when the chemical charge is ignited. The reaction front runs to the opposite lying end and here jumps over to the other side of the insulating plate and, on this side, runs back to the ignition end. In this way, approximately twice the running time with half the flow of the generator is obtained compared with an embodiment without the partition element.

It is a disadvantage in this generator that the flow and supply duration cannot be influenced beyond the strictly geometric doubling of the reaction path.

Swiss Patent 183,336 discloses a chemical oxygen generator which is partitioned into segments by partition walls extending in the longitudinal direction. However, no information is provided as to the material of the partition walls and the function thereof. The description however permits the assumption to be made that the partition walls are made of paraffinated asbestos board.

Swiss Patent 180,448 discloses a generator having component partition walls made of asbestos or metal coated with paraffin. These walls are arranged transversely to the direction of movement of the reaction front. The walls uniformly distribute the gas flowing through the generator. The paraffin coating apparently is provided only as a protection against corrosion.

The two last-mentioned patents provide no suggestion as to how the flow and running time of a generator can be influenced with built-in walls.

SUMMARY OF THE INVENTION

It is an object of the invention to improve the chemical oxygen generator described above so that the oxygen flow and the duration of supply is influenced by a reaction-control member by means of the material of which the member is made and/or by means of the shape of this member.

According to a feature of the invention, one or more reaction-control members made of sheet metal are mounted so as to be parallel to the direction of movement of the reaction front.

As an alternate embodiment, the reaction-control member can be in the form of spiral conveyor which is made of sheet metal or a thermally-insulating material.

Furthermore, the object of the invention can also be achieved by configuring the reaction-control member as a spirally-wound band made of sheet metal or a thermally-insulating material with the band being disposed in a can-shaped housing and extending from the bottom wall to the top wall thereof. One end of the band is connected to the outer wall of the housing while the other end of the band is near the center of the housing whereby a spirally-wound channel is formed. An ignition device can be provided at one end of the channel while an oxygen outlet is provided at the other end thereof.

It is an advantage of the invention that the oxygen flow and the supply duration can be influenced within wide limits by the selection of different materials and material thicknesses as well as by the number, arrangement and configuration of the reaction-control members. The oxygen flow can be adapted also to a pregiven profile.

A reaction-control member made of sheet metal draws heat away from the reaction front and thereby slows the reaction. This takes place on the one hand in that the sheet metal itself absorbs heat and on the other hand in that the sheet metal diverts the heat to the generator housing and via the housing to the ambient. The nature of the material and the thickness of the sheet metal influence the quantity of heat diverted away.

A reaction-control member made of thermally-insulating material impedes the conduction of heat into the portion of the chemical charge lying behind the reaction-control member and thereby reduces the pre-warming of the charge and prevents a jump-over of the reaction. In this way, a geometric lengthening of the reaction path is provided by a corresponding shape of the reaction-control member combined with an increased supply duration of the generator. Materials such as high-quality steel, brass and copper can be used as the sheet metal. The following substances are suitable as thermally-insulating material: plates, fiber plates, nonwoven formed fabrics or foamed bodies made of glass, ceramic or other inorganic materials.

Reaction-control members made of sheet metal can be arranged parallelly to the direction of movement of the reaction front over the entire reaction path or parts thereof. The reaction-control members draw heat away from the reaction front and thereby slow the reaction and increase the supply duration of the generator.

According to another embodiment of the invention, the reaction-control member can have a helical shape and be in the form of a helical conveyor which forms a helically-shaped path for the reaction front. On the other hand, the oxygen generator can have a housing in the form of a worm casing which produces a spirally-wound path for the reaction front. The supply duration is again significantly lengthened with both these embodiments.

BRIEF DESCRIPTION OF THE DRAWINGS

The invention will now be described with reference to the drawings wherein:

FIG. 1 is a schematic of a chemical oxygen generator having a reaction-control member built in parallel to the direction of movement of the reaction front;

FIGS. 2a and 2b show two different embodiments, in section, of the reaction-control member built in parallel to the direction of movement of the reaction front;

DESCRIPTION OF THE PREFERRED EMBODIMENTS OF THE INVENTION

Figure 3:
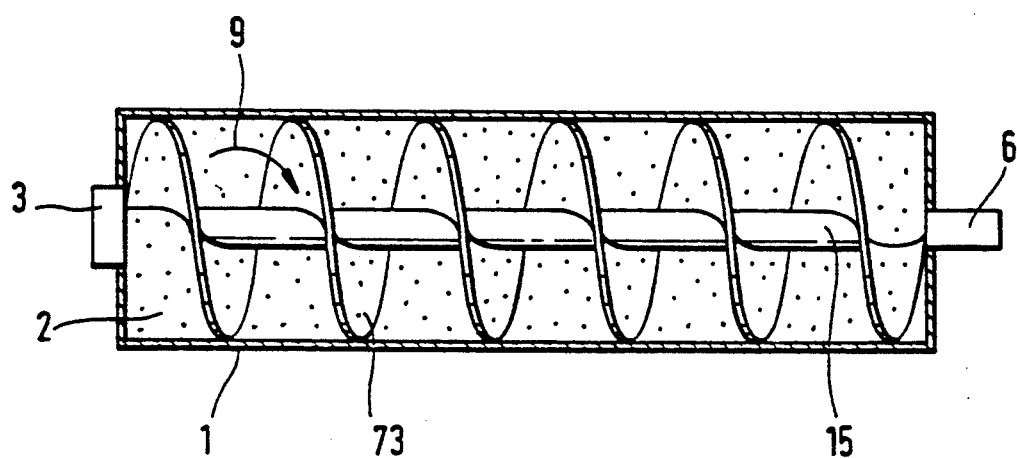
FIG. 3 is another embodiment of the oxygen generator of the invention wherein the reaction-control member is configured to have a helical shape; and, FIG. 4 is still another embodiment of the chemical oxygen generator of the invention wherein the reaction-control member is spirally wound.

The chemical oxygen generator of FIG. 1 includes a cylindrical housing 1 wherein a chemical charge 2 is disposed which can be brought to reaction by means of an ignition device 3. The reaction runs from the ignition end 4 of the housing 1 to the opposite-lying end 5 with an outlet 6 being provided at the end 5 for passing the released oxygen from the housing.

A reaction-control member 71 is mounted within the chemical charge 2 and parallel to the direction 9 of movement of the reaction front. The reaction-control member is made of metal and is connected to the housing 1. The reaction-control member 71 does not extend completely to the longitudinal ends (4, 5) of the housing 1 whereby a space connecting all component regions of the chemical charge 2 is provided and where a common ignition or a common delivery of the oxygen to the outlet 6 takes place. The sheet metal absorbs heat and conducts the heat to the housing 1 and from the housing to the ambient. This heat is removed from the chemical reaction whereby the speed of the reaction is reduced. The oxygen flow generated in this way is lower when compared to a generator without built-in control members.

FIGS. 2a and 2b show two embodiments of a reaction-control member 71 in section. The cross-sectional area of the housing 1 is subdivided into several chambers 12 by the reaction-control member 71 and the reaction front moves simultaneously in these chambers 12. The reaction is slowed by the removal of energy and its transport to the ambient. The extent of the energy removal is influenced by the number and size of the chambers 12 which are formed and by nature and thickness of the sheet metal from which the reaction-control member 71 is made.

FIG. 3 shows a generator, in section, wherein a reaction-control member 73 is mounted in the housing 1 within the chemical charge 2 with the reaction-control member being wound in the shape of a helical conveyor 73. The reaction-control member extends radially from a closed core 15 to the wall of the housing 1 and axially from the ignition end of the housing 1 up to the opposite-lying end thereof on which the oxygen outlet 6 is arranged. After ignition by the ignition device 3, the reaction front 9 runs helically to the outlet 6. A greatly extended path of the reaction front 9 is obtained with a correspondingly lengthened duration of supply. The response of the oxygen flow can be adapted to a pre-given profile by means of a variable slope of the reaction-control member 73 along the path of the reaction front 9. Furthermore, it is possible to arrange the reaction-control member 73 in only one component region of the path of the reaction front 9.

FIG. 4 shows still another embodiment of an oxygen generator having a housing 1 in the shape of a flat can. The reaction-control member is configured as a spirally-wound band 74 and extends from the base 16 to the cover 17 of the housing 1. The one end of the band is connected to the outer wall of the housing 1 and the other end lies in the vicinity of the center of the housing 1. The band 74 provides a spirally-wound channel 18 in the inner space of the housing 1 with the channel 18 being filled with the chemical charge 2. An oxygen outlet 6 is provided at the inner end of the channel 18 and an ignition device 3 is mounted at the outer end of this channel. The arrangement of the ignition device 3 and the oxygen outlet 6 can be exchanged. The reaction front 9 moves in the spirally-wound channel 18.

The supply duration is increased by the geometrically extended path of the reaction front 9 when the reaction-control member (73, 74) is made of an insulating material. The supply duration is then further increased by means of the slowing of the reaction when the reaction-control member (73, 74) is made of sheet metal.

It is understood that the foregoing description is that of the preferred embodiments of the invention and that various changes and modifications may be made thereto without departing from the spirit and scope of the invention as defined in the appended claims.

What is claimed is:

1. A chemical oxygen generator for generating and releasing oxygen, the chemical oxygen generator comprising:

an elongated housing having a predetermined length and defining an interior;

said housing having first and second end walls and a side wall connecting said end walls and defining the length of said housing; said end walls and said side wall conjointly defining said interior of said housing;

a chemical charge disposed in said interior and containing chemicals which release oxygen in an exothermal reaction;

ignition means for initiating the exothermal reaction so as to cause the exothermal reaction to travel as a reaction front through said chemical charge in a predetermined direction of movement;

said ignition means being mounted on said first end wall;

said housing having an outlet formed in said second end wall for passing released oxygen from said interior;

a reaction-control member mounted in said housing;

said housing defining a longitudinal axis concentric with said side wall;

said housing including a closed core disposed in said interior along said longitudinal axis;

said reaction-control member being configured as a fixed helical blade extending radially from said closed core to sad side wall so as to define a helical channel extending along said length of said housing from said ignition means on said first end wall to said outlet on said second end wall; and, said chemical charge filling said helical channel between said end walls whereby said reaction front runs helically through said helical channel from said first end wall to said second end wall.

2. The chemical oxygen generator of claim 1, said reaction-control member being made of sheet metal.

3. The chemical oxygen generator of claim 1, said reaction-control member being made of thermally-insulating material.

4. The chemical oxygen generator of claim 3, said thermally-insulating layer being made of a substance selected from the group consisting of glass, ceramic, a mineral material, nonwoven formed fabric, a fiber plate and a foamed body.

5. A chemical oxygen generator comprising:

a housing having an interior;

said housing being configured as a can having a longitudinal center axis;

said housing having top and bottom walls perpendicular to said axis and a side wall interconnecting said top and bottom walls;

said side wall being disposed at an outer radius away from said longitudinal axis;

a chemical charge disposed in said interior and containing chemicals which release oxygen in an exothermal reaction;

ignition means for initiating the exothermal reaction so as to cause the exothermal reaction to travel as a reaction front through said chemical charge in a predetermined direction of movement;

a reaction-control member mounted in said housing;

said reaction-control member being a fixed spirally wound band having a width extending between said top and bottom walls;

said band having a first end spaced at an inner radius away from said longitudinal center axis and a second end connected to said side wall;

said inner radius being less than said outer radius;

said band and said top and bottom walls conjointly defining a spiral channel having respective channel ends at said first and second ends of said band;

said ignition means being mounted at one of said channel ends;

said housing having an outlet formed at the other one of said channel ends for conducting the oxygen generated by the exothermal reaction out of said housing; and, said chemical charge filling said spiral channel between said ignition means and said outlet whereby said reaction front runs spirally through said spiral channel from said ignition means to said outlet.

6. The chemical oxygen generator of claim 5, said reaction-control member being made of sheet metal.

7. The chemical oxygen generator of claim 5, said reaction-control member being made of thermally-insulating material.

8. The chemical oxygen generator of claim 7, thermally-insulating layer being made of a substance selected from the group consisting of glass, ceramic, a mineral material, nonwoven formed fabric, a fiber plate and a foamed body.

* * * * *

UNITED STATES PATENT AND TRADEMARK OFFICE
CERTIFICATE OF CORRECTION

PATENT NO. : 5,322,669

DATED : June 21, 1994

INVENTOR(S) : Hans-Christoph Bechthold, Rainer Ernst, Uwe Gerdts and Karsten Vogeler It is certified that error appears in the above-identified patent and that said Letters Patent is hereby corrected as shown below:

In column 2, line 17: between "of" and "spiral", insert -- a --.

In column 2, line 36: delete "be adapted also" and substitute -- also be adapted -- therefor.

In column 2, line 40: between "place" and "on", insert -- , --.

In column 2, line 40: between "hand" and "in", insert -- , --.

In column 2, line 41: between "and" and "on", insert -- , --.

In column 2, line 42: between "hand" and "in", insert -- , --.

Figures 4A, 4B:
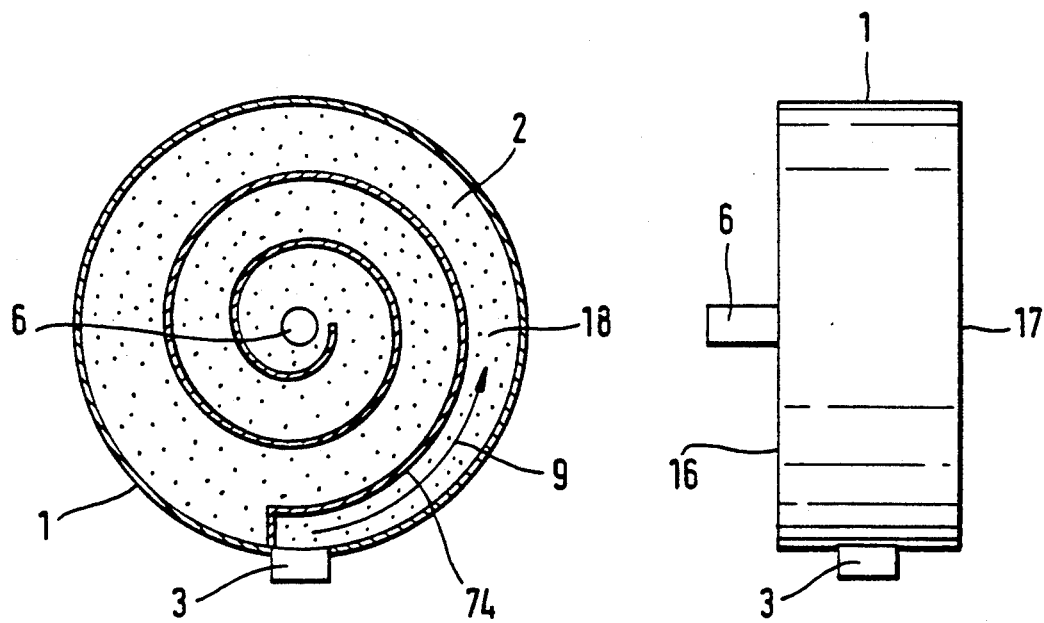

In column 3, line 20: delete "FIG. 4 is" and substitute -- FIGS. 4a and 4b show -- therefor.

UNITED STATES PATENT AND TRADEMARK OFFICE
CERTIFICATE OF CORRECTION

PATENT NO. : 5,322,669

DATED : June 21, 1994

INVENTOR(S) : Hans-Christoph Bechthold, Rainer Ernst, Uwe Gerdts and Karsten Vogeler It is certified that error appears in the above-identified patent and that said Letters Patent is hereby corrected as shown below:

In column 4, line 10: delete "FIG. 4 shows" and substitute -- FIGS. 4a and 4b show -- therefor.

In column 4, line 67: delete "sad" and substitute -- said -- therefor.

In column 6, line 27: between "claim 7," and "thermally", insert -- said --.

Signed and Sealed this

Twentieth Day of September, 1994

Attest:

Attesting Officer

BRUCE LEHMAN

Commissioner of Patents and Trademarks